June 23, 1953     N. J. PETERS     2,642,797
CHEESE PRESS
Filed Sept. 16, 1949     2 Sheets-Sheet 1
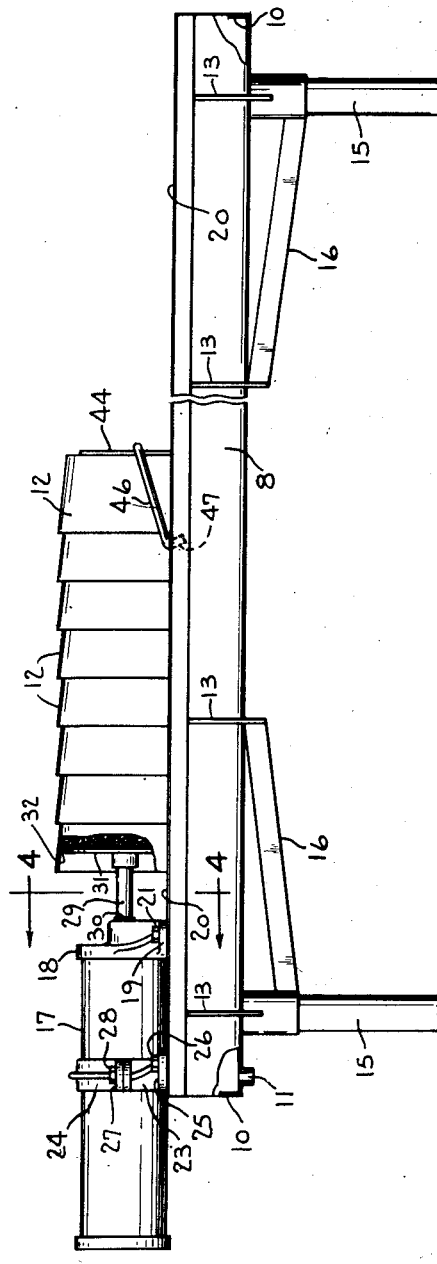
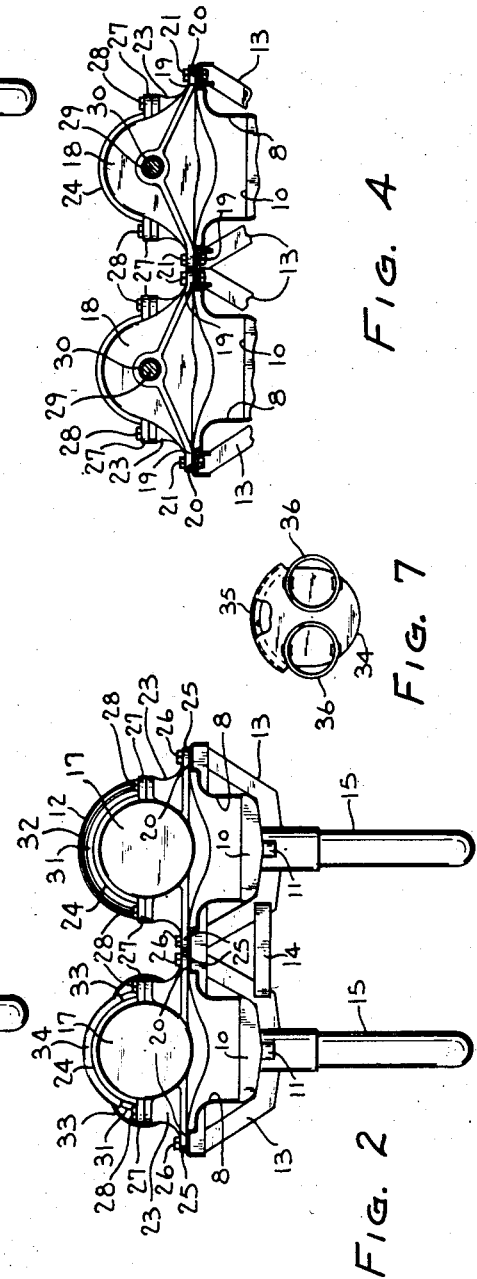
INVENTOR.
Norman J. Peters
BY Quarles & French
Attys.

June 23, 1953 N. J. PETERS 2,642,797
CHEESE PRESS
Filed Sept. 16, 1949 2 Sheets-Sheet 2
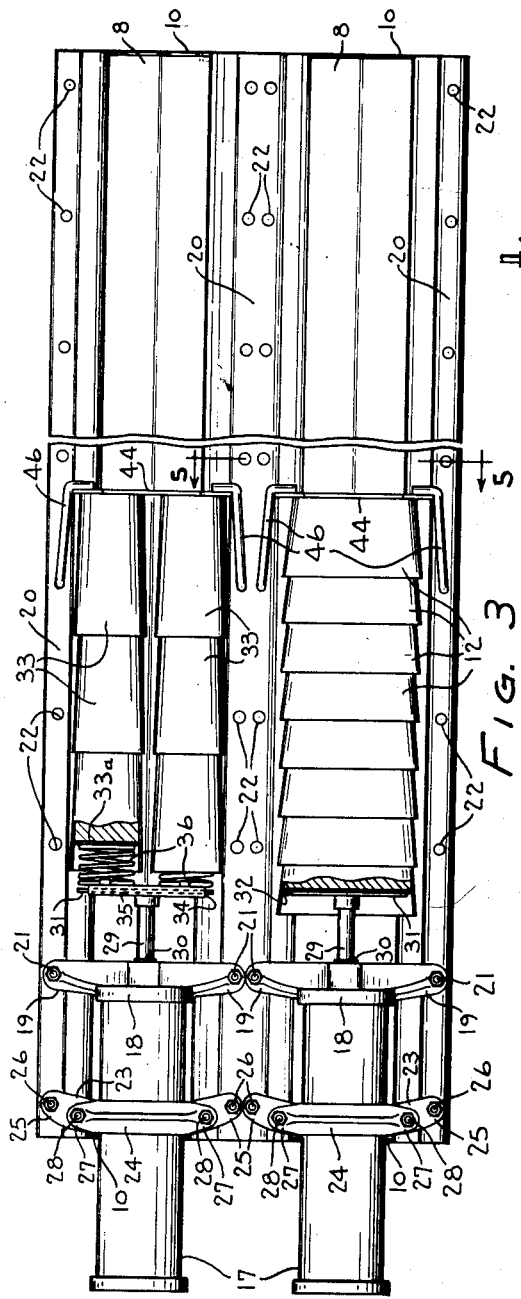
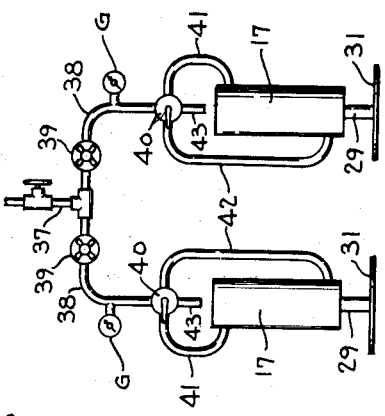
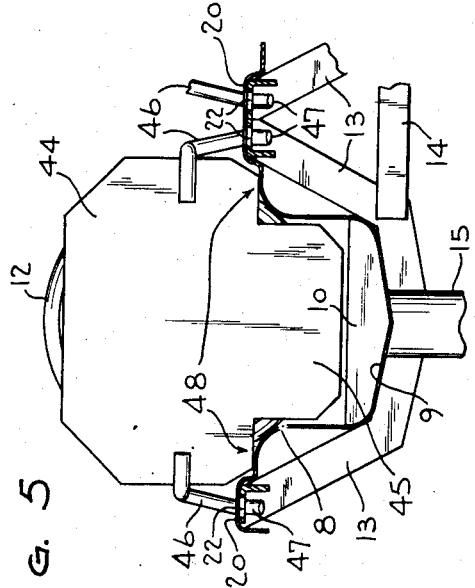
INVENTOR.
Norman J. Peters
BY Quarles & French
Attys.

Patented June 23, 1953

2,642,797

UNITED STATES PATENT OFFICE 2,642,797

CHEESE PRESS

Norman J. Peters, Fond du Lac, Wis., assignor to Damrow Brothers Company, Fond du Lac, Wis., a corporation of Wisconsin Application September 16, 1949, Serial No. 115,971

1 Claim. (Cl. 100—199)

The invention relates to cheese presses.

The general object of the invention is to provide certain simplifications of the cheese press shown in my prior U. S. Patent No. 2,362,089, of November 7, 1944, in which the regular ratchets for putting additional pressure onto the cheese hoops are employed. By the present invention the ratchets are eliminated and stainless steel, adjustably mounted, back stop brackets or plates and a long double acting hydraulic cylinder is used. There is enough stroke for the pistons to take up the pressing of the hoops even on long presses. Most of the exposed parts are of stainless steel, so that they can be readily kept clean. The press is so designed that practically all of the present cheese molds now used for cheddar cheese can be used in this press without any extra attachments. The bottom of the trough is pitched toward the center for easier draining and cleaning of the press, the ends are closed and a special drain connection is provided at one end and the holes to receive the legs of backing plate are on the top of the press to permit easier cleaning. The width of each trough is such that its upper edges form guides for the large or daisy size cheese molds and thus eliminate the fixed brackets of my prior patent. The hydraulic cylinders and the backing plates are independent units, so that they can be used at either end of the press, which is desirable as in many instances changes in the location of the cylinder or cylinders is desired. The cylinder supports fit into the same series of holes as are used for the backing plates.

Pressing block attachments are readily secured onto the piston push plate to suit the particular size of hoop put into the press.

The invention further consists in the several features hereinafter set forth and more particularly defined by the claim at the conclusion hereof.

In the drawings:

Fig. 1 is a side elevation view of a cheese press embodying the invention, parts being broken away and parts being shown in section;

Fig. 2 is an end view looking toward the backs of the pressing cylinders;

Fig. 3 is a plan view, parts being broken away and parts being shown in section;

Fig. 4 is a detailed vertical sectional view taken on the line 4—4 of Fig. 1;

Fig. 5 is an enlarged detailed vertical sectional view, taken on the line 5—5 of Fig. 3;

Fig. 6 is a diagrammatic view of the cylinder piping;

Fig. 7 is a detailed elevation view of one of the ram head attachments.

Referring to the drawings, the press includes a large stainless steel metal plate which is pressed out at intermediate portions to form lengthwise extending, smooth walled, spaced troughs 8 whose bottoms 9 are pitched toward the center and whose ends 10 are closed so that fluid deposited in the troughs may readily drain out the drain outlets 11 adjacent one of the ends of each trough. The width of each trough is such that a large or daisy size cheese hoop 12 will easily rest on the top edges thereof, as shown in Figs. 2 and 3. The troughs are reinforced by transversely disposed metal frame members 13 which are connected by cross ties 14, some of these frame members being mounted in the upper ends of supporting legs 15 which may be braced by brace bars 16 connecting said legs with certain of the frame members, as shown in Fig. 1.

A double acting hydraulic cylinder 17 is associated with each trough. Each cylinder 17 has a head casting 18 having apertured side lugs or feet 19 adapted to be adjustably clamped to the top portions 20 of the troughs by bolts 21 which may be inserted in any one of a number of alined sets of holes 22 in the tops of each trough. For further supporting each cylinder intermediate its ends a two part collar or saddle comprising a lower half portion 23 and an upper half portion 24 is used. The lower saddle portion 23 is provided with apertured side lugs or feet 25 adapted to be adjustably clamped to the top portions 20 of the troughs by bolts 26 which may be inserted in one of the sets of holes 22 in the tops of each trough in spaced relation to the bolts 21 for the head casting 18. The upper half 24 of the saddle has lugs 27 secured by bolts 28 to the upper part of the lower half 23 of the saddle.

Each cylinder 17 has a piston working therein whose long rod 29 extends through a suitably packed opening 30 in the head 18 and carries a ram head 31. For the large or daisy size cheese hoops 12 the ram head 31 engages directly with the follower 32 of the adjacent hoop as shown in Fig. 1 and the nearer cylinder in Fig. 3, while for smaller size cheese hoops, such as the longhorn hoops 33, attachments of the type shown in Figs. 3 and 7 may be mounted on the ram head 31. These attachments each comprise a plate 34 having an arcuate flanged portion 35 to engage over the ram head and carrying spaced sets of relatively stiff springs 36, each spring engageable at its forward end with a follower 33a of the hoop 33 as shown in Fig. 3. With this attachment the spaced sets of cheeses are simultaneously pressed by a single ram and the springs 36 serve to equalize or compensate for differences in reaction pressures set up by either set of cheeses.

The piping for the cylinders 17 is shown in Fig. 6 and comprises a valve controlled supply pipe 37 for air or water under pressure, branch pipes 38 each having a valve 39 and a pressure gauge G and each connected with a manually controlled four way valve 40. Each valve 40 connects a pipe 41 with one end of the cylinder, and a pipe 42 at the other end of the cylinder, and an exhaust or drain pipe 43. Thus, either or both of the cylinders may be supplied with operating fluid by manipulating the valves 39, and each cylinder is controlled by its valve 40 so that the piston is positively moved forward or backward depending upon the setting of the valve 40 and may be held in any set position.

The cylinders 17 may be placed at either end of the troughs or intermediate their ends, if desired, by proper selection of the holes 22 for the bolts 21 and 26.

A flat or plain backing plate 44 of uniform thickness as shown in Figs. 1 and 3 and formed as shown in Fig. 5 so that a portion 45 thereof projecting down into the trough is provided at opposite sides with inclined integrally connected rods 46 whose downturned ends 47 are adapted to engage in any one of the sets of holes 22 on opposite sides of the trough as shown in Figs. 1 and 3, these plates and rods being made of stainless steel. The lower edges 48 of said plates rest on the top edges of the trough. Thus the plates may be secured in any desired operating position at either end of the press or intermediate its ends.

With the above apparatus, the cylinder or cylinders 17 are mounted on the press and the loaded cheese hoops 12 or 33 are placed therein between the ram head 31 and the adjustably positioned backing plate 44, and then the valve 40 for this cylinder is operated to move the ram head toward the backing plate to squeeze or press the excess whey from the cheeses in the cheese hoops, which whey is readily drained from the bottom of the trough through its drain opening 11. When the cheese mass has been pressed to the desired extent, the valve 40 is turned to reverse the movement of the piston 29 and head 31 so that the cheese hoops may be readily removed. The stroke of the pistons 29 are long enough to take up the pressing of the hoops even on long presses, and the operation is much quicker than that of presses using the hand operated ratchet which is also difficult to keep clean.

I desire it to be understood that this invention is not to be limited to any particular form or arrangement of parts except in so far as such limitations are included in the claim.

What I claim as my invention is:

In a cheese press, the combination of a trough having a series of lengthwise spaced alined sets of openings in its top edges, a plain flat metal backing plate of uniform thickness resting at its lower edge portion on the top of said trough and depending below said lower edge portion into said trough, leg members formed of round metal rods secured to the front side of said plate above the trough and projecting downwardly and rearwardly therefrom and having forwardly angled feet engageable in a set of said alined openings to hold the plate in fixed relation to said trough, and a pressing cylinder secured to said trough and provided with a ram cooperating with said plate to press cheese hoops interposed between said ram and plate.

NORMAN J. PETERS.

References Cited in the file of this patent

UNITED STATES PATENTS

| Number | Name | Date |
|---|---|---|
| 179,505 | Beach | July 4, 1876 |
| 837,652 | Wilder | Dec. 4, 1906 |
| 1,124,775 | Martin | Jan. 12, 1915 |
| 1,135,757 | Bloch-Pimentel | Apr. 13, 1915 |
| 1,239,652 | Wickham | Sept. 11, 1917 |
| 2,054,304 | Steinbach | Sept. 15, 1936 |
| 2,362,089 | Peters | Nov. 7, 1944 |
| 2,535,592 | Mueller | Dec. 26, 1950 |